United States Patent Office 3,410,930
Patented Nov. 12, 1968

3,410,930
METHOD OF IMPROVING THE OPERATION OF A CUPOLA
Thomas E. Barlow, Deerfield, Ill., assignor to International Minerals & Chemical Corporation, a corporation of New York
No Drawing. Continuation of application Ser. No. 227,699, Oct. 2, 1962. This application June 4, 1965, Ser. No. 461,496
2 Claims. (Cl. 264—30)

This application is a continuation application of my co-pending application Ser. No. 227,699, filed Oct. 2, 1962, now abandoned.

This invention relates to improvements in refractory compositions and their use. In its major aspect the present invention relates to dense, acidic refractory compositions suitable for use in ladles for molten iron or steel, cupola linings, taphole plugs, runners, and other structures subjected to the corrosive action of molten metal and the slag carried with the metal. In another of its aspects this invention relates to improvements in the operation of cupolas obtained by the use of an improved monolithic refractory lining therefor. In still another of its aspects this invention relates to a method for inhibiting the subsurface formation and penetration of FeO in dense, acidic refractory linings.

In cupola operation and in ladles handling ferrous metals such as gray iron, steel and malleable, there is a problem of FeO formation and the deleterious effects which it has, particularly upon refractory linings. The amount of such formation depends upon the situation. For example, in the cupola, the oxide formation is very rapid because of the presence of free oxygen moving at a high speed past the refractory wall. In the case of a ladle, again the formation of oxide is high because of the presence of liquid metal in contact with the lining. After the ladle has been emptied, there is still a film of liquid metal retained on the lining. At such high temperatures this film of liquid metal oxidizes rapidly and forms FeO. Therefore, although the conditions are different in a cupola than in a ladle, the problem is essentially the same but through a slightly different mechanism. In a cupola there is very little metal in contact with the refractory but the rate of oxygen flow in that area is so great that it will oxidize even nonliquid iron and provide FeO. In the case of a ladle, there is less oxygen, but there is sufficient to rapidly combine with the metal film left in the ladle after it is emptied. It is a major object of the present invention to minimize the formation and prevent the penetration of these FeO materials into the refractory, thus destroying the refractory.

It has been determined that the greatest destruction of the refractory occurs through the subsurface formation and subsequent penetration of metal oxides such as FeO which combine rapidly with the normal $SiO_2$, $Al_2O_3$ compositions of conventional dense acid linings. The FeO content forms a ternary of low melting temperature which rapidly penetrates into the pores of the refractory, thereby causing further destruction and compounding. I have found that the inclusion of certain materials in the dense acidic refractory composition, either in combination with carbon or without carbon, will prevent these FeO formations from occurring below the surface of the refractory. As a result, the melting point of the refractory remains high and losses are drastically reduced. To a certain extent a similar effect is experienced when carbon is added by itself but the effect is minor because of the fact that carbon oxidizes readily to $CO_2$ and is lost. The loss of the carbon leaves voids in the refractory which, in turn, reduces its refractory value. In contrast to this my materials are not destroyed readily with oxygen but rather remain intact to prevent the suburface formation and consequent penetration of FeO. Furthermore, the carbon by itself reduces the fusion ability or ceramic bond characteristics of monolithic, unfired refractories. Therefore, they have not been acceptable in unfired refractories because they create a weak, friable wall. I have found that the presence of my materials permits carbon to be useful in these conditions first, because it prevents the oxidation of the carbon to $CO_2$, and also because it maintains vitrification and depth of fusion which is superior to that obtained without my materials and without the carbon. In other words, my materials actually increase the strength and the depth of fusion of the unfired refractory and more than compensate for and eliminate the deleterious effect of carbon.

In a cupola this has importance beyond just improving the refractoriness by eliminating the penetration of the FeO. In commercial operation as the FeO penetrates the refractory and reduces its fusion temperature, it then fluxes the refractory from the wall and permits it to move down into the well of the cupola in high volumes. This slag moving into the well of the cupola has, because of the penetration of FeO, a high percentage of FeO in its make-up. By analysis, for example, it has been found that slags on the wall of the cupola to a measurable depth will contain about 8 to about 15% FeO. These slags move into the well of the cupola and then are removed from the cupola through either the slag hole or the tap hole. Prior to the time that they are removed, however, molten metal drops through the slag blanket. The presence of high percentages of FeO at this point immediately starts robbing the molten metal of both silicon and carbon. As a result, definite silicon losses and carbon losses take place at this time. This is demonstrated also by the fact that the slag as it is removed from the cupola, instead of having 8 to 15% FeO, may be down to 0.5% or 1%. The FeO content of the slag has been reduced by the action of the silicon metal in the molten metal coming through the blanket of slag. Therefore, in a cupola, a refractory lining which resists FeO penetration also reduces the amount of FeO content in the slag blanket. In this manner there is an elimination or drastic reduction in the necessity for reduction of FeO by the molten metal and thereby an increase in the silicon content of the metal as well as the carbon content. These changes in the composition of the metal have important significance in the operation of the cupola. For example, reductions in the coke, silicon and limestone in the charge permit greater operating economies. Also, better regulation of temperature and silicon and carbon contents in the melt are possible.

In the ladle, a similar situation takes place, but there is enough difference to require some explanation. In this case, as the ladle is emptied the film of molten metal oxidizes rapidly leaving a film of FeO. This film penetrates into the lining, thereby reducing its refractoriness. However, even more important in this case, is the fact that this penetration of FeO permits larger quantities of FeO to be retained by the ladle wall. When the ladle is refilled (and common practice is to refill it many, many times), the molten metal coming into the ladle immediately picks up the FeO off of the wall and carries it as an undesirable slag. This material being carried by the molten metal from the ladle into the mold and mold cavity creates defects in the castings which may show up as ceroxides or, in foundry nomenclature, pinholes and snotters. It is extremely desirable to keep these ladles clean or free of such iron oxide formations. My refractory linings, when used in ladles, prevents the formation of FeO in excess quantities and thereby minimizes this problem.

It is, therefore, an object of the present invention to provide an improved dense acidic refractory composition suitable for use as linings in cupolas, in ladles for molten iron or steel for taphole plugs and other structures subjected to corrosive and erosive action of molten metal and the slag carried with the metal.

It is another object of this invention to provide a method for inhibiting the subsurface formation and the penetration of FeO in dense acidic refractory linings.

It is a further object of this invention to provide improvements in the operation of cupolas obtained by the use of an improved monolithic refractory lining therefor.

Additional objects of the present invention will be apparent from the description which follows.

In accordance with the present invention I have discovered that the objects of this invention can be accomplished by including in a dense acidic type refractory composition from about 2½ to about 15% by weight, preferably between about 4 and 8%, of a reductive element which is chemically and thermodynamically capable of deoxidizing FeO at temperatures in the range of about 1800° F. to about 3000° F. to produce a nonalkaline refractory oxide. Examples of such metals include silicon, aluminum, chromium, manganese and the like. These metals may be employed either as the commercially pure metal or as alloys such as ferrosilicon, ferromanganese, ferrochrome, aluminum-silicon, chromium-silicon, manganese-silicon and silicon-carbide and other commercially available forms of said reductive metals. When employed as alloys it is preferred that the reductive metals be present as the major component as for example, 50–98% silicon in the ferrosilicon form. It will be understood that the weight proportion recited hereinabove refers to the weight of reductive metal component so that when alloys or other metallo-carbon forms are used, allowances for their nonreductive metal content can be made. Experience has indicated that the metallo-carbon forms such as silicon carbide, generally do not function as well as the free metal at lower operating temperatures.

My improved refractory composition may also, optionally, contain up to about 15% by weight of carbon which may be in the form of graphite, finely divided coke, sea coal, petroleum, pitch and the like. As pointed out hereinabove, the reductive metal component in combination with the carbon prevents the rapid oxidation of the carbon to $CO_2$ with its consequent loss, and also maintains a vitrification and depth of fusion in the refractory which is superior to that obtained without the use of the reductive metals and without the carbon.

In its broadest aspect the present invention comprises a dense acidic refractory composition containing from about 20 to about 80% by weight of conventional fire clay, from about 20 to about 80% by weight of silica sand, from about 2½ to about 15% by weight of a reductive element chemically and thermodynamically capable of reducing FeO at a temperature in the range of 1800 to 3000° F. to form a nonalkaline refractory oxide, and from 0 to about 15% by weight of carbon. The reductive material is preferably selected from the group consisting of silicon, silicon-carbide, aluminum, chromium, manganese, ferroalloys of the foregoing, and mixtures and alloys of the foregoing. It will be appreciated that the iron in such alloys is merely a diluent and serves no chemical or refractory purpose in the composition.

In a preferred embodiment the refractory composition of the present invention contains about 40% by weight of fire clay, about 50% by weight of silica sand, about 5% by weight of carbon and about 5% by weight of silicon metal.

In the preparation of these compositions the individual ingredients are preferably in finely divided form, viz., having a mesh size below about ⅛ inch and preferably between about 20 and 200 mesh. The individual ingredients can be mulled in conventional mixing equipment and applied as monolithic linings in cupolas, ladles or the like, using conventional patching and ramming guns.

Alternatively, the mixture may be formed into bricks of any desired shape and fired at ordinary firing temperatures, for example, from about 1800° to about 2400° F. for periods of from about 12 to about 24 hours.

It is important in the practice of the present invention that the refractory composition not contain significant amounts of materials which are capable of consuming by side reactions the reductive metal component present therein. For example, the refractory composition should not contain such things as magnesite, or limestone or other alkaline metals which would be reduced by reductive metal either during the use of said refractory or in the firing of the same as in the case with bricks. With bricks it is recognized that a certain amount of the reductive metal is consumed in the firing process. Hence, when the refractory composition is intended for brick making, it is desirable to use an excess amount of reductive metal and to adjust the firing step so that the final brick composition contains the reductive metal in a proportion within the range recited hereinabove. Alternatively, two different metals can be used, such as silicon and aluminum, one of which may be consumed in the firing step.

The refractory compositions of the present invention are to be distinguished from other refractories which have in the past included reductive metals. The present refractory compositions are dense and acidic in character as opposed to either porous and insulating or alkaline in character. For example, aluminum metal has been included in brick manufacture for use as a blowing agent to increase the porosity and lessen the density of the resulting brick thereby improving its insulating capabilities. In such instances all but a minor amount of the aluminum is consumed in performing its function. The refractory compositions of the present invention do not function primarily as insulating materials. Indeed, as employed in cupolas and in ladle linings it is important that they pass the heat rather than retain it in order to avoid damaging the furnace or ladle.

It is significant to note that the composition of the present invention serves a dual function which is both chemical and ceramic. From a ceramic standpoint one would not add a reductive metal to the refractory composition since these materials are known to have a deleterious effect upon the refractoriness of the composition. I have found, however, that the chemical benefit contributed by the reductive metal component more than offsets the deleterious effect upon the refractoriness of the resulting composition. That is, I have recognized that the chemical reactions taking place in a cupola or a ladle at the surface and below the surface of the refractory lining cause by far the greater amount of damage to said lining than the chemical effects of heat and physical erosion. Thus, by the inclusion of a reductive metal in a dense acidic refractory composition, I have been able to minimize refractory loss through subsurface FeO formation and the fluxing of the refractory lining caused thereby.

The following examples are intended to illustrate the underlying principles of the present invention and are not to be construed as unduly limiting thereof.

EXAMPLE 1

A series of tests were made to determine:

(1) Confined expansion and hot strengths of cupola lining refractories containing various amounts and grades of silicon-carbide, and (2) The effectiveness of ferrosilicon and silicon-carbide additions to a commercial cupola refractory (Cupoline 77) against slag penetration. The confined-thermal expansion and hot-strength properties of specimens of the various refractory materials were determined according to AFS-recommended procedures for testing same. The composition, expansion characteristics and hot strength of the various refractories are listed in Table 1.

also had considerably higher hot strength than did the other compositions.

In the test for the evaluation of the effectiveness of ferrosilicon and silicon-carbide additions to the cupola lining composition, standard specimens 1½" in diameter by 2" long were made of the various refractory materials. Each specimen had a center cavity molded into one end. The center cavity was $27/32"$ deep and ⅜" in diameter with a hemispherical base. Two types of slag were employed. The composition of the slags was:

(1) A mixture of cupola slag and iron oxide ground to —70 mesh in the proportion of 85% slag and 15% foundry-grade iron oxide ($Fe_2O_3$);

(2) A mixture of iron oxide and carbon composed of 90% foundry-grade iron oxide and 10% carbon ground to —70 mesh. It was intended that the carbon and iron oxide would react when heated to give FeO and CO.

The hole in the dried specimen of the refractory was filled with 1.00 gm. of the powdered slag mixture. The refractory specimen was charged into a dilatometer at 2500° F., held at 2500° F. for 10 minutes, heated to 2700° F. in about 10 minutes, held at 2700° F. for 12 minutes and removed from the furnace. The specimen was cooled, broken lengthwise and examined for slag attack. (The amount and composition of the slag and the heating rate TABLE 1.—CONFINED EXPANSION AND HOT STRENGTHS OF CUPOLA-LINING REFRACTORIES CONTAINING SILICON CARBIDE [1]

|  | Mixture | | | | | |
| --- | --- | --- | --- | --- | --- | --- |
|  | 254 | 254A [2] | 255 | 256 | 257 | 258 |
| Composition, percent: | | | | | | |
| Lawco Clay | 23 | 23 | 23 | 23 | 23 | 23 |
| Clarion Clay | 19 | 19 | 19 | 19 | 19 | 19 |
| Davis Sand (AGF48) | 58 | 58 | 53 | 53 | 53 | 53 |
| SiC, —85%, —100 Mesh | | | 5 | | | |
| SiC, —85%, —10 Mesh | | | | | 5 | |
| SiC, —97%, —100 Mesh | | | | 5 | | |
| SiC, —94%, —100 Mesh [3] | | | | | | 5 |
| Water | 10.7 | 10.7 | 10.8 | 10.6 | 10.6 | 10.9 |
| Confined Expansion, percent: | | | | | | |
| Dry | —1.60 | —1.60 | —1.90 | —1.85 | —1.75 | —1.95 |
| 500° F | —1.45 | —1.45 | —1.80 | —1.70 | —1.65 | —1.85 |
| 1,000° F | —1.90 | —0.95 | —1.30 | —0.90 | —1.10 | —1.30 |
| 1,500° F | —0.35 | —0.15 | —0.45 | —0.40 | —0.40 | —0.60 |
| 2,000° F | —0.25 | —0.15 | —0.55 | —0.50 | —0.40 | —0.70 |
| 2,500° F | —0.40 | —0.60 | —1.35 | —1.30 | —0.95 | —0.45 |
| 2,600° F | —0.50 | —1.40 | —2.75 | —2.15 | —2.10 | —0.55 |
| 2,700° F | —1.50 | —2.60 | —3.80 | —2.70 | —2.95 | —0.85 |
| 2,800° F, 0 min | —1.90 | —3.45 | —5.15 | —2.65 | —2.95 | —1.05 |
| 2,800° F, 5 min | —2.85 | —3.15 | —4.95 | —2.80 | —2.95 | —1.45 |
| 2,800° F., 10 min | —3.20 | +1.55 | —4.35 | —2.85 | —2.95 | —1.65 |
| Hot Strength, p.s.i.: | | | | | | |
| 500° F | | 278 | | 305 | | 300 |
| 1,000° F | | 560 | | 620 | | 598 |
| 1,500° F | | 1,000+ | | 1,000+ | | 1,000+ |
| 2,000° F | | 1,000+ | | 1,000+ | | 1,000+ |
| 2,500° F | | 130 | | 125 | | 228 |
| 2,600° F | | 60 | | 58 | | 165 |
| 2,700° F | | 20 | | 35 | | 65 |
| 2,800° F | | 5 | | 25 | | 28 |

[1] All samples confined in quartz tubes.
[2] Same composition as Mixture 254 but another mixture.
[3] Dust-collector fines.

It will be seen that the best results were obtained with mixture 258 which contained 5% of silicon-carbide from the dust collector. A considerable portion of the dust collector fines was believed to be —325 mesh. Mixture 258 given appeared to give better results than did various other conditions which were tried.)

The composition of the various refractory mixtures evaluated in the slag-penetration test is listed in Table 2.

TABLE 2.—COMPOSITION OF CUPOLA-LINING REFRACTORIES USED TO EVALUATE SLAG PENETRATION

| | Mixture | | | | | | | | | | |
|---|---|---|---|---|---|---|---|---|---|---|---|
| | 254 | 259 | 260 | 261 | 262 | 263 | 264 | 265 | 266 | 267 | 268 |
| Composition, percent: | | | | | | | | | | | |
| Lawco Clay | 23 | 23 | 23 | 23 | 23 | 23 | 23 | 23 | 23 | 23 | 23 |
| Clarion Clay | 19 | 19 | 19 | 19 | 19 | 19 | 19 | 19 | 19 | 19 | 19 |
| Davis Sand (AGF48) | 58 | 53 | 53 | 48 | 48 | 55 | 54 | 52 | 53 | 53 | 53 |
| FeSi, 75%, −100 Mesh | | 5 | | 10 | | 3 | 4 | 6 | | | |
| FeSi, 90% Si, −100 Mesh | | | | | | | | | 5 | | |
| FeSi, 98% Si, −100 Mesh | | | | | | | | | | 5 | |
| FeSi, 50% Si, −100 Mesh | | | | | | | | | | | 5 |
| SiC, 85% SiC, −100 Mesh | | | 5 | | 10 | | | | | | |
| Water | 10.5 | 10.6 | 10.5 | 10.8 | 11.0 | 10.5 | 10.6 | 10.7 | 10.7 | 10.8 | 10.8 |

The results obtained when samples of Cupoline 77 containing 0, 3, 4, 5, 6, and 10% of 75% ferrosilicon using the mixture of 85% of cupola slag with 15% of iron oxide showed that the slag penetration was severe in Cupoline 77 and progressively decreased in severity as the ferrosilicon content increased. Small differences in the amount of penetration could best be determined by observing the number of pinholes on the inside surface of the slag cavity in the refractory. The number of pinholes decreased as the penetration decreased. This test appears sensitive enough to show the difference of refractories containing 4 or 5% of ferrosilicon.

The results obtained when Cupoline 77 samples containing 0, 5 and 10% of 75% ferrosilicon were tested with the iron oxide-carbon mixture were not as distinctive as those obtained when the cupola slag-iron oxide mixture was employed because the former tended to boil.

The effect of the addition of various grades of ferrosilicon to the Cupoline 77 on slag penetration was also observed. Samples of Cupoline 77 contained 5% of 50, 75, 90 and 98% ferrosilicon, respectively. The slag penetration (cupola slag-iron oxide penetration) decreased progressively as the silicon content of the ferrosilicon increased. The effectiveness of silicon carbide for reducing the penetration of slag into Cupoline 77 was also observed. The samples of Cupoline 77 contained 0, 5 and 10% of 85% silicon carbide. The silicon carbide reduced the slag penetration but was not as effective as equal additions of 75% ferrosilicon.

EXAMPLE 2

A number of dense acidic refractory compositions containing ferrosilicon, silicon, aluminum, graphite, pitch in various proportions were prepared and evaluated to determine their confined expansion and hot strengths, according to American Foundrymen's Society recommended procedures for testing molding sand. All samples were confined in graphite tubes while determining thermal expansion. The results of these tests are set forth in Tables 3 and 4.

TABLE 3.—PROPERTIES OF LADLE REFRACTORIES

| | Sample | | | | | | | | | |
|---|---|---|---|---|---|---|---|---|---|---|
| | 269 | 284 | 285 | 286 | 287 | 288 | 276 | 283 | 292 | 293 |
| Composition, percent: | | | | | | | | | | |
| Revivo clay | | | 1,2(42) | (24) | (20) | (22) | 22 | 22 | 22 | 22 |
| Western Bentonite | | | (1) | (1) | (1) | (2) | 2 | 2 | 2 | 2 |
| Davis Sand | | | (54) | (56¼) | (24) | (38) | 55 | 51 | 52 | 49 |
| Ferrosilicon, 75%, −150 Mesh | | | | | | | 10 | | | |
| Silicon, 98%, −200 Mesh | | | (4) | | | | | | 3 | 3 |
| Aluminum, Alcoa 101, −100 Mesh | | | | | | | | | 1 | 1 |
| Silica Flour, −200 Mesh | | | (15) | (20) | (15) | | 15 | 15 | 15 | 15 |
| Graphite (Jackson) | | | (3¾) | (4) | 3(12) | (15) | 10 | 4 | 4 | 4 |
| Glutrin (50% Solids) | | | | (2) | (2) | | 2 | 2 | 2 | 2 |
| Pitch | | | | 4(30) | 5(10) | | (6) | | | 2 |
| Other | (7) | (8) | (9) | (10) | (11) | (12) | | 5 | | |
| Water | 12.8 | 8.8 | 11.0 | 11.0 | 9.9 | 10.1 | 10.9 | 10.0 | 10.0 | 10.2 |
| Expansion, percent: | | | | | | | | | | |
| Dry | −1.65 | −0.15 | −1.55 | −1.85 | −1.05 | −1.00 | −1.20 | −1.15 | −0.80 | −1.25 |
| 500° F | −1.35 | +0.05 | −1.35 | −1.65 | −0.90 | −0.80 | −0.95 | −1.00 | −0.65 | −1.00 |
| 1100° F | −0.55 | +0.80 | −0.75 | −0.85 | −0.45 | −0.30 | −0.20 | −0.35 | −0.05 | −0.20 |
| 1500° F | −0.05 | +1.35 | −0.15 | −0.55 | +0.10 | +0.20 | −0.30 | +0.25 | +0.50 | +0.20 |
| 2000° F | −0.10 | +1.35 | −0.20 | −0.55 | +0.05 | +0.10 | +0.25 | +0.15 | +0.45 | 0.00 |
| 2500° F | −0.60 | +1.75 | +0.90 | +0.70 | +1.65 | −0.15 | +0.65 | +0.55 | +1.10 | +0.90 |
| 2600° F | −0.15 | +2.05 | +1.00 | +0.10 | +6.90 | −1.85 | +0.55 | +0.55 | +1.15 | +1.10 |
| 2700° F | +0.55 | +2.10 | +1.10 | −0.15 | +5.55 | −3.45 | +1.10 | +0.45 | +1.20 | +1.40 |
| 2800° F., 0 Min | −0.70 | +1.15 | +1.15 | −1.55 | +4.40 | +0.50 | +1.30 | +0.45 | +1.30 | +1.45 |
| 2800° F., 5 Min | −6.85 | +0.20 | +1.15 | −0.80 | +3.00 | +10.65 | +1.80 | +0.35 | +1.70 | +1.50 |
| 2800° F., 10 Min | −1.65 | −0.25 | +1.15 | +5.65 | +2.30 | +12.15 | +2.25 | +0.45 | +3.60 | +1.50 |
| Hot Strength, p.s.i.: | | | | | | | | | | |
| 500° F | | 420 | 725 | | | | 740 | 890 | | |
| 1,000° F | | 835 | 1,000+ | | | | 770 | 930 | | |
| 1,500° F | | 1,000+ | 1,000+ | | | | 1,000+ | 1,000+ | | |
| 2,000° F | | 1,000+ | 1,000+ | | | | 1,000+ | 1,000+ | | |
| 2,500° F | | 1,000+ | 275 | 195 | 345 | 365 | 85 | 670 | 405 | 605 | 810 |
| 2,600° F | | 1,000+ | 135 | 140 | 170 | 80 | 35 | 365 | 255 | 360 | 465 |
| 2,700° F | | 425 | 80 | 55 | 110 | 50 | 20 | 175 | 140 | 125 | 180 |
| 2,800° F | | 2.5 | 35 | 40 | 60 | 30 | 10 | 90 | 75 | 50 | 80 |
| Apparent Porosity, percent | | 20 | | 23 | 22 | 31 | 24 | | | | |

[1] Values in parentheses are those reported by the Sponsor. [2] Sandy Revivo. [3] Fluid coke 6 percent; graphite 6 percent, total 12 precent. [4] Raw Kyanite. [5] Mixed Aplite fines. [6] Alsifer. [7] Meltzona. [8] Caroline. [9] Templine. [10] Electroline. [11] CLL30. [12] CLL25.

TABLE 4.—EFFECTS OF ALUMINUM OR SILICON ON THE PROPERTIES OF LADLE REFRACTORIES

| | Samples | | | | | | | | | | | | | | | | | | | | |
|---|---|---|---|---|---|---|---|---|---|---|---|---|---|---|---|---|---|---|---|---|---|
| | 267 | 268 | 275 | 271 | 278 | 270 | 279 | 277 | 280 | 274 | 272 | 273 | 281 | 282 | 289 | 290 | 291 | 294 | 295 |
| Composition, percent: | | | | | | | | | | | | | | | | | | | |
| Revivo | 28 | 28 | 28 | 28 | 28 | 28 | 28 | 28 | 28 | 28 | 28 | 28 | 28 | 28 | 28 | 28 | 28 | 28 | 28 |
| K-Bond | 17 | 17 | 17 | 17 | 17 | 17 | 17 | 17 | 17 | 17 | 17 | 17 | 17 | 17 | 17 | 17 | 17 | 17 | 17 |
| Davis Sand | 55 | 51 | 51 | 51 | 51 | 51 | 48.5 | 49 | 49 | 52.5 | 51.5 | 51 | 53 | 52 | 48 | 48 | 48 | 50 | 49 |
| Aluminum | | 1⁴ | 2⁴ | 3⁴ | 4⁴ | 4 | | 4¹ | 4² | 1½⁴ | 1½⁴ | 1⁵ | 2 | | | 2 | 2¹ | 2⁵ | 2⁶ |
| Silicon⁵ | | | | | | | 6.5 | 5 | 4 | 2 | 3 | 3 | | | 4 | 4 | 3 | | |
| Alsifer⁵ | | | | | | | | | | | | | | | | | | | |
| Pitch | | | | | | | | | | | | | | | | | | | |
| Water | 11.0 | 11.1 | 11.0 | 11.1 | 11.0 | 11.0 | 10.9 | 11.0 | 11.0 | 11.0 | 11.0 | 11.0 | 11.1 | 11.0 | 11.2 | 10.8 | 11.0 | 11.0 | 10.8 |
| Expansion, percent: | | | | | | | | | | | | | | | | | | | |
| Dry | −1.45 | −1.45 | −1.80 | −1.85 | −1.70 | −1.85 | −1.70 | −1.70 | −1.80 | −1.75 | −1.90 | −1.90 | −1.80 | −1.70 | −1.25 | −1.15 | −1.30 | −1.30 | −1.30 |
| 500° F | −1.25 | −1.20 | −1.60 | −1.60 | −1.50 | −1.55 | −1.35 | −1.55 | −1.55 | −1.55 | −1.60 | −1.60 | −1.60 | −1.50 | −1.05 | −0.90 | −1.15 | −1.10 | −1.05 |
| 1,000° F | −0.65 | −0.60 | −1.00 | −1.05 | −0.95 | −1.00 | −0.55 | −0.90 | −1.05 | −1.00 | −0.80 | −1.05 | −1.00 | −0.85 | −0.45 | −0.20 | −0.50 | −0.15 | −0.35 |
| 1,500° F | −0.05 | 0.00 | −0.40 | −0.35 | −0.25 | −0.30 | 0.00 | −0.25 | −0.30 | −0.35 | −0.20 | −0.35 | −0.45 | −0.40 | −0.05 | 0.00 | −0.30 | +0.10 | +0.25 |
| 2,000° F | +0.05 | +0.05 | −0.70 | −0.40 | −0.15 | −0.05 | −0.10 | −0.40 | −0.45 | −0.40 | −0.30 | −0.45 | −0.50 | −0.55 | −0.10 | −0.10 | −0.15 | −0.15 | +0.10 |
| 2,500° F | −0.15 | −0.05 | −0.30 | +0.10 | −0.10 | −0.25 | −0.30 | −0.05 | −0.15 | −0.10 | −0.05 | −0.05 | +0.40 | −0.15 | −0.05 | +0.85 | +0.95 | +1.00 | 0.00 |
| 2,600° F | −0.05 | +0.05 | −0.10 | +0.10 | −0.10 | −0.05 | −0.30 | −0.15 | −0.20 | −0.05 | −0.05 | −0.05 | +0.35 | +0.15 | +1.25 | +1.45 | +1.40 | +1.35 | +1.25 |
| 2,700° F | −0.70 | +0.15 | −0.10 | +0.10 | −0.25 | −0.25 | −0.30 | −0.20 | −0.40 | −0.05 | −0.15 | −0.05 | +0.20 | +0.85 | +1.75 | +1.85 | +1.95 | +1.85 | +1.85 |
| 2,800° F, 0 Min | −1.55 | +0.45 | +0.05 | +0.10 | −0.35 | −0.40 | −0.50 | −0.30 | −0.45 | −0.05 | −0.15 | −0.05 | +0.35 | +1.00 | +1.95 | +2.40 | +2.10 | +2.20 | +2.35 |
| 2,800° F, 5 Min | −3.45 | +0.50 | +0.35 | +0.10 | −0.35 | −0.60 | −0.65 | −0.50 | −0.65 | −0.10 | −0.25 | −0.05 | +0.20 | +1.00 | +2.05 | +2.50 | +1.65 | +1.75 | +2.50 |
| 2,800° F, 10 Min | −4.10 | +0.85 | +0.35 | +0.05 | −0.30 | −0.65 | −0.65 | −0.30 | −0.70 | −0.05 | −0.15 | −0.05 | +0.05 | +1.60 | +1.80 | +2.30 | +0.95 | +0.65 | +1.00 |
| Wet Weight, grams | 72.43 | 71.62 | 72.46 | 71.90 | 71.35 | 72.94 | 73.50 | 73.08 | 72.37 | 71.72 | 71.68 | 71.72 | 70.82 | 70.17 | 70.75 | 71.18 | 70.22 | 72.10 | 73.00 |
| Hot Strength, p.s.i.: | | | | | | | | | | | | | | | | | | | |
| 500° F | 260 | 260 | 370 | | 260 | | | | | | 260 | | | 370 | | | | | |
| 1,000° F | 610 | 585 | 735 | | 535 | | | | | | 530 | | | 460 | | | | | |
| 1,500° F | 1,000+ | 1,000+ | 1,000+ | | 1,000+ | | | | | | 1,000+ | | | 1,000+ | | | | | |
| 2,000° F | 1,000+ | 1,000+ | 1,000+ | | 1,000+ | | | | | | 1,000+ | | | 1,000+ | | | | | |
| 2,500° F | 220 | 285 | 440 | 200 | 190 | 200 | 215 | | 255 | | 225 | 355 | 245 | 350 | 385 | 510 | 460 | 583 | 455 |
| 2,600° F | 100 | 190 | 285 | 120 | 105 | 125 | 140 | | 140 | | | 185 | 150 | 200 | 230 | 325 | 290 | 290 | 380 |
| 2,700° F | 42.5 | 140 | 170 | 85 | 80 | 60 | 75 | | 75 | | 85 | 120 | 75 | 115 | 150 | 125 | 120 | 170 | 275 |
| 2,800° F | 20 | 80 | 105 | 40 | 45 | 32 | 40 | | 45 | | 50 | 60 | 30 | 50 | 50 | 60 | 45 | 80 | 110 |

¹ Alcoa atomized No. 5481, −40 mesh, 96% −50 mesh. ² Alcoa atomized No. 101, −40 mesh, 96% −50 mesh. ³ Silicon, 98% Si, −325 mesh. ⁴ Silicon, 98% Si, −100 mesh. ⁵ Alsifer: 20% Al, 40% Si, 40% Fe, −200 mesh.

The data shown in Table 3 are for refractories intended for use as ladle linings. The data presented in Table 4 are for refractories intended for linings in cupolas.

The data show that aluminum, comparatively, has the greatest beneficial effect with respect to expansion and strength properties in refractories.

While this invention has been described in terms of its preferred embodiments and modifications, it will be appreciated that changes can be made without departing from the spirit and scope of the invention.

I claim:

1. A method of improving the operation of a cupola which comprises lining said cupola with a monolithic unfired dense acidic refractory composition containing, in finely divided form, and in substantially homogeneous admixture:

(a) from about 20 to about 80% by weight of fire clay;
(b) from about 20 to about 80% by weight of silica sand;
(c) from about 0 to about 15% by weight of carbon; and
(d) from about 2½ to about 15% by weight of silicon.

2. A method of improving the operation of a cupola which comprises lining said cupola with a monolithic unfired dense acidic refractory composition containing, in finely divided form, and in substantially homogeneous admixture:

(a) from about 20 to about 80% by weight of fire clay;
(b) from about 20 to about 80% by weight of silica sand;
(c) from about 0 to about 15% by weight of carbon; and
(d) from about 2½ to about 15% by weight of a ferro-silicon alloy containing in excess of 50% by weight of silicon.

References Cited

UNITED STATES PATENTS

| 1,374,909 | 4/1921 | DeBats | 106—56 |
| 2,881,083 | 4/1959 | Veale | 106—56 |
| 3,083,111 | 3/1963 | Nickerson | 106—56 |
| 3,214,250 | 10/1965 | Peras | 106—65 |

ROBERT F. WHITE, *Primary Examiner.*

K. HOVET, *Assistant Examiner.*

UNITED STATES PATENT OFFICE
CERTIFICATE OF CORRECTION

Patent No. 3,410,930                                                                  November 12, 1968

Thomas E. Barlow

It is certified that error appears in the above identified patent and that said Letters Patent are hereby corrected as shown below:

Columns 5 and 6, TABLE 1, second column, line 11, "-1.90" should read -- -0.90 --. Columns 7 and 8, TABLE 2, first column, fourth item "FeSi, 75%" should read -- FeSi, 75% Si --; same column, TABLE 3, first column under Expansion, percent, third item "1100° F." should read -- 1000° F. --; same table, under Expansion, percent, seventh column, line 4 thereof, "-0.30" should read -- +0.30 --; same column, line 7 thereof, "+0.55" should read -- +0.85 --.

Signed and sealed this 10th day of March 1970.

(SEAL)
Attest:

Edward M. Fletcher, Jr.                                        WILLIAM E. SCHUYLER, JR.
Attesting Officer                                                          Commissioner of Patents